(12) United States Patent
Krishna et al.

(10) Patent No.: US 9,015,448 B2
(45) Date of Patent: Apr. 21, 2015

(54) MESSAGE BROADCAST WITH ROUTER BYPASSING

(75) Inventors: Tushar Krishna, Cambridge, MA (US); Bradford M. Beckmann, Redmond, WA (US); Steven K. Reinhardt, Vancouver, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1180 days.

(21) Appl. No.: 12/817,945

(22) Filed: Jun. 17, 2010

(65) Prior Publication Data
US 2011/0314255 A1  Dec. 22, 2011

(51) Int. Cl.
*G06F 15/00* (2006.01)
*G06F 15/76* (2006.01)
*G06F 15/173* (2006.01)

(52) U.S. Cl.
CPC ................ *G06F 15/17337* (2013.01)

(58) Field of Classification Search
None
See application file for complete search history.

(56) References Cited

U.S. PATENT DOCUMENTS

| | | | | |
|---|---|---|---|---|
| 8,347,038 | B2 * | 1/2013 | Sapronov et al. | 711/130 |
| 2009/0240915 | A1 * | 9/2009 | Faraj | 712/28 |
| 2009/0252171 | A1 | 10/2009 | Kumar et al. | |

OTHER PUBLICATIONS

Amit Kumar et al, "Express Virtual Channels: Towards the Ideal Interconnection Fabric," In Proceedings of the International Symposium on Computer Architecture, 2007, 12 pages.

Boris Grot and Stephen W. Keckler, "Scalable On-Chip Interconnect Topologies," In Proceedings of the International Symposium on High-Performance Computer Architecture, 2009, 11 pages.

Amit Kumar, Li-Shiuan Peh and Niraj K. Jha, "Token Flow Control," In Proceedings of the 41st Annual IEEE/ACM International Symposium on Microarchitecture, 2008, 12 pages.

Boris Grot, Joel Hestness, Stephen W. Keckler, and Onur Mutlu, "Express Cube Topologies for On-Chip Interconnects," in the Proceedings of the 15th International Symposium on High-Performance Computer Architecture, 2009, 12 pages.

Tushar Krishna, Amit Kumar, Patrick Chiang, Mattan Erez, Li-Shiuan Peh, "NoC with Near-Ideal Express Virtual Channels Using Global-Line Communication," High Performance Interconnects, 2008. HOTI '08, 16th IEEE Symposium, 2008, 10 pages.

* cited by examiner

*Primary Examiner* — Corey S Faherty
(74) *Attorney, Agent, or Firm* — Meyertons, Hood, Kivlin, Kowert & Goetzel, P.C.

(57) ABSTRACT

A processor and method for broadcasting data among a plurality of processing cores is disclosed. The processor includes a plurality of processing cores connected by point-to-point connections. A first of the processing cores includes a router that includes at least an allocation unit and an output port. The allocation unit is configured to determine that respective input buffers on at least two others of the processing cores are available to receive given data. The output port is usable by the router to send the given data across one of the point-to-point connections. The router is configured to send the given data contingent on determining that the respective input buffers are available. Furthermore, the processor is configured to deliver the data to the at least two other processing cores in response to the first processing core sending the data once across the point-to-point connection.

20 Claims, 10 Drawing Sheets

MESSAGE BROADCAST WITH ROUTER BYPASSING

BACKGROUND

Modern computer systems often include multiple processors and/or multiple processing cores that must communicate with on another. For example, shared memory systems that maintain coherency between data on caches in different processing cores often deploy complex cache coherence protocols that broadcast many messages between the processing elements. Additionally, parallel programs often depend on point-to-point, broadcast, scatter/gather, and other message communication patterns among the multiple processing cores of a computer system. Architectural design trends indicate that future systems will have even higher processing core counts.

As the number of processing elements in computer systems continues to increase, both academic and forward-looking industry projects have focused on finding communications solutions that are capable of scaling to large processing core counts while maintaining low communication latency. Some such projects have proposed the use of interconnection networks as a replacement for conventional shared buses and ad-hoc wiring solutions. For example, on-chip interconnects (a.k.a., networks-on-chip) have been used to connect multiple processing cores on a single chip to one another according to various network topologies, such as two or three-dimensional grids (i.e., mesh) with links between logically adjacent cores.

In traditional interconnects, messages are often sent as packets (or as portions of packets known as "flits"), which must traverse multiple cores before arriving at a final destination core. Since the flit must often traverse a multi-stage router pipeline at each intermediate core en route to its final destination core, messages between topologically distant cores on the interconnect can accumulate significant end-to-end latencies due to pipeline-traversal overheads.

SUMMARY

According to various embodiments described herein, processing cores within a group of processing cores may employ various techniques to implement efficient message broadcasting (i.e., one-to-all messaging) among the cores. In some embodiments, the cores may be connected by point-to-point links in a multi-dimensional mesh interconnect. To broadcast a message, a broadcasting core may first determine that respective input buffers are available to receive and store the data on two or more other cores in a sequence (e.g., sequential cores along a given dimension of the mesh). In response to determining that sufficient buffer space exists on each core in the sequence, the broadcaster sends the data to the two or more cores in the sequence using a router-bypassing technique that allows each intermediate core in the sequence to store a copy of the data and to forward the data to the next core in the sequence in a manner that bypasses one or more router pipeline stages of the intermediate core.

In some embodiments, since each intermediate core in the sequence stores the data (i.e., copy-at-switch), one or more of those cores may repeat the sending process described above for a different respective sequence of cores (e.g., those along a different given dimension). Thus, a message can be propagated quickly to all nodes in the point-to-point network.

Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Router bypassing solutions may reduce the latency of some multi-hop, point-to-point messages by allowing those messages to bypass some pipeline stages at intermediate routers. However, since such techniques target point-to-point communications, they fail to significantly reduce router-pipeline overheads for broadcast messages (e.g., cache coherence messages) where a given processing core needs to communicate a particular message to multiple (e.g., all) other processing cores. In such scenarios, a sending core employing traditional router bypassing solutions to broadcast a message to n other processing cores may still need to send n point-to-point messages, each to a different one of the cores. As a result, broadcast messages in such interconnects traditionally incur significant router overhead, even when the interconnect employs traditional router bypassing techniques.

According to various embodiments to be described herein, processing cores within a group of processing cores may employ one or more techniques to support efficient message broadcasting among the cores. In such embodiments, the cores may be connected by point-to-point links in a multi-dimensional mesh interconnect. As used herein, the term point-to-point is used to refer to a link that connects exactly two nodes in a network or to a network composed of such links. To broadcast a message, a broadcasting core may first determine that respective input buffers are available to receive and store the data on each core along a first dimension of the mesh. When the broadcaster determines that sufficient buffer space exists on each receiver in the dimension, the broadcaster broadcasts the data to the cores in the chosen dimension using a modified router-bypassing technique that allows each core in the dimension to store a copy of the data while still bypassing one or more router pipeline stages at each core. Various embodiments of modified router-bypassing techniques that enable this are described in more detail below.

Figure 1:
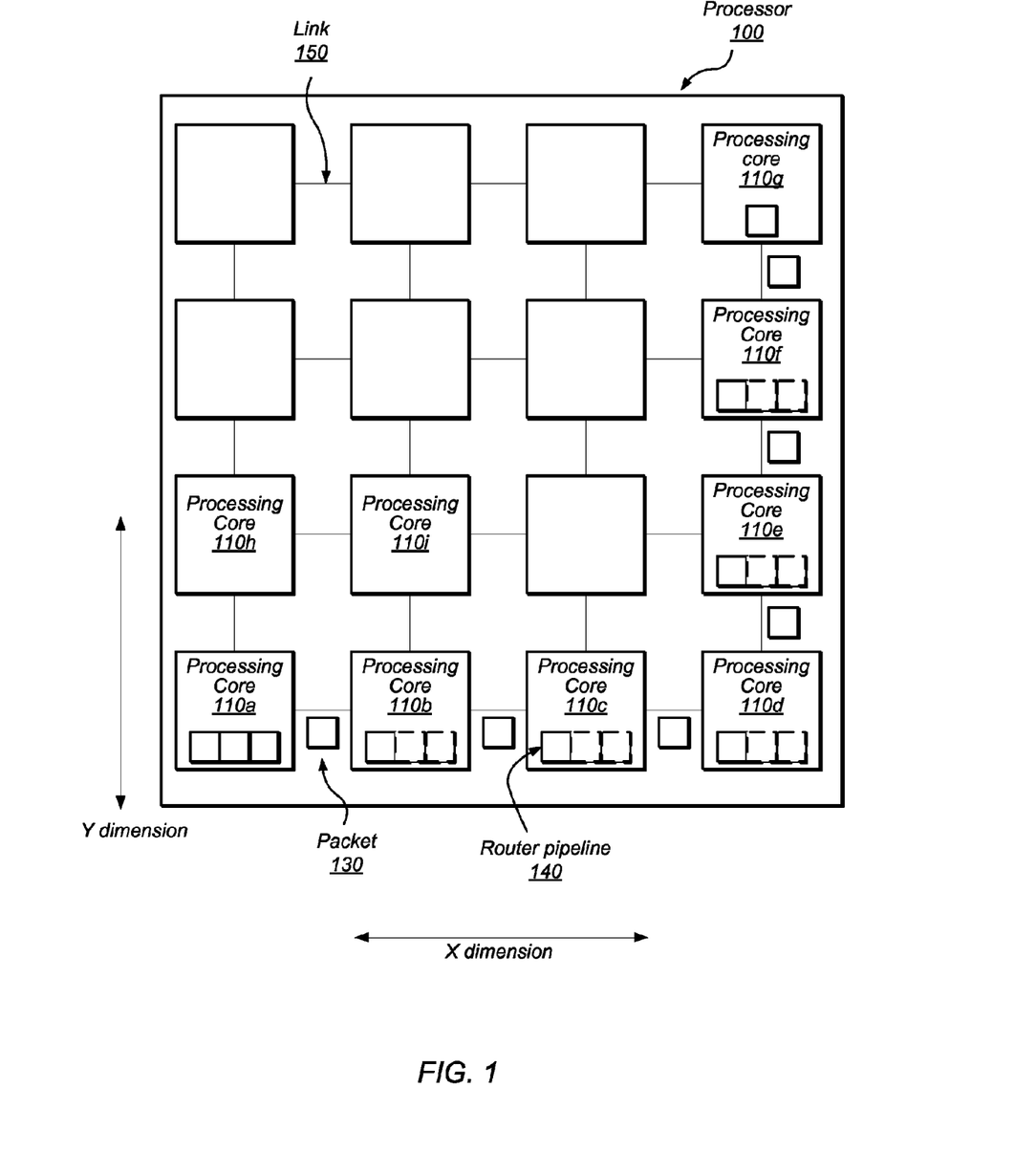
FIG. 1 illustrates an interconnect employing a 2-dimensional mesh topology configured to implement low-latency broadcasts, according to various embodiments.

FIG. 1 illustrates an interconnect employing a 2-dimensional mesh topology configured to implement low-latency broadcasts, according to various embodiments. In reference to different topologies, the terms mesh is used herein to describe various topologies in which the nodes are arranged in one or more ordered series (e.g., rows) according to one or more dimensions (e.g., X, Y, Z), where each set of adjacent nodes in each series is connected by a respective link. For example, the term 1D mesh may refer to a single row of N nodes in a single dimension, each pair of adjacent nodes being connected to one another. The term 2D mesh may refer to an N×N configuration with $N^2$ nodes arranged according to N rows (i.e., rows in X-dimension) and N columns (i.e., rows in Y-dimension), with links between adjacent nodes in both dimensions, as shown in FIG. 1. In other embodiments, a 2D mesh may also refer to an N×M configuration with N rows and M columns, where N and M are not equal. The term 3D mesh may refer to a cube topology with $N^3$ nodes arranged into N rows, N columns, and N stacks (i.e., rows in Z-dimension). A mesh topology need not necessarily be symmetric along each dimension. For example, a 3D mesh may be arranged in an N×M×U topology, where N, M, and U are independent of one another and not necessarily equal. These topologies can also be referred to as grids. In some embodiments, the last node in each row may include a link back to the first node in the row (e.g., a torus topology).

In FIG. 1, processor 100 comprises 16 processing cores (e.g., 110a-110i) that are connected by a plurality of links (e.g., 150) in a 2D mesh interconnect. As illustrated, the 16 processing cores are arranged in four X-dimension rows and four Y-dimension rows. Processor 100 may correspond to a 16-way chip multi-processor (CMP) with an on-chip network and may be implemented on a single die.

While the embodiments described herein are illustrated in terms of communications between processing cores on a CMP, one skilled in the art having benefit of this disclosure will understand that the techniques described herein are also applicable to other multi-processor architectures, which may include multiple independent processors on different dies, multiple different CMPs, SMPs (symmetric multi-processors), or other processing elements. As used herein, the term processing element may refer to any such components, such as a processing core or independent processor. When described in terms of the interconnect, the processing elements may be referred to as nodes of the on-chip network.

In addition, the 2D mesh interconnect pictured in FIG. 1 and used repeatedly herein to describe various embodiments is an example only and is not intended to be limiting. In various embodiments, the techniques described herein may be implemented using various other network topologies, such as a 3-dimensional mesh, a hierarchical tree-like topology, hierarchical 3D mesh, 2 or 3 dimensional torus topologies, and/or various other topologies. As used herein, the term interconnect is used to refer generally to any interconnection network where a plurality of processing elements on a computer are connected using point-to-point links, regardless of the specific network topology formed by those links.

According to FIG. 1, processor 100 includes 16 processing cores (e.g., 110a-110i) connected by a 2D mesh interconnect. As labeled in the illustration, the cores are laid out in rows according to X and Y dimensions of the grid, each dimension being four processors deep. In various embodiments, the dimensions may be arbitrarily deep (e.g., 8×8, 16×16). As discussed above, in some embodiments, processing cores may be connected by a 3D mesh interconnect in rows according to X, Y, and Z dimensions.

Each core of FIG. 1 is connected to every adjacent core by respective links of the mesh interconnect, such as link 150. For example, core 110a is connected to adjacent cores 110b and 110h by an east and north link respectively. Processing core 110i is connected to four adjacent cores by north, south, east, and west links, and so forth.

In different embodiments, each core may communicate with an adjacent core by sending a message to the adjacent core over a respective link connecting the two. In some embodiments, a message sent from one core to another may take the form of a network packet, such as packet 130. That is, the packet may contain payload data (i.e., data to be communicated to the destination core) and routing data (e.g., in one or more packet headers) identifying the destination core and/or other routing information.

In some embodiments, a message or packet may be broken down into multiple "flits" due to particular implementation details. For example, a message may be broken down into multiple flits according to the minimum size of input buffer allocation on each core. However, for purposes of clarity, embodiments are described herein as sending and receiving packets. However, it should be understood that the messages exchanged by processing elements in various embodiments described herein may take the form of flits and/or of other packet components.

Since the links in the 2D mesh of processor 100 only directly connect adjacent nodes, messages between topologically distant nodes require multiple hops. For example, in order for processing core 110a to send packet 130 to processing core 110g, the packet must traverse across the entire X dimension of the mesh network (via cores 110b-110d) and then across the entire Y dimension of the mesh network (via cores 110e-110g). Therefore, sending this message includes the packet making six hops across seven cores.

As described above, for each of the five intermediate cores (110b-110g), the packet may need to traverse a multi-stage router pipeline, such as router pipeline 140. In some embodiments, each intermediate core may include a router component that performs various routing functions for the packets received by the core. For example, in various stages, the router may buffer the received packet in an input buffer, determine the next core to which the packet should be forwarded, determine that the next core has an available input buffer for receiving the packet, allocate a crossbar switch to the packet, and finally forward the packet along the determined link.

According to the illustrated embodiment, the cores of processor 100 include respective routers with a three-stage pipeline, such as router pipeline 140. The adjacent squares illustrated in each core 110 represent the pipelines stages that packet 130 traverses at each router. Traversing these pipeline stages may introduce overhead and consequently, add significant end-to-end latency.

Intermediate-router latency is particularly problematic for broadcast operations since such operations require that a message be conveyed to every other core, including the most topologically distant ones. Traditional copy-at-switch broadcast techniques reduce some of the overhead by configuring each intermediate router to respond to receiving the packet by copying and sending the packet to each adjacent core. However, the effectiveness of copy-at-switch techniques is still bound by the time required to reach the most topologically distant core. While some traditional router-bypassing techniques, such as Express Virtual Channels (EVC) and Multi-drop Express Channels (MECS), can reduce this time by allow a packet to skip some intermediate pipeline stages, and therefore, to reach a distant core more quickly, such bypassing techniques are incompatible with copy-at-switch techniques because traditional router-bypassing techniques do not store a copy of the packet at the intermediate nodes. Therefore, the intermediate node cannot send copies of the packet to multiple other adjacent nodes.

According to various embodiments, a core may employ various router-bypassing techniques that do store a copy of the packet at intermediate routers and thus enable the network of processing elements to perform efficient broadcast operations using copy-at-switch broadcast techniques. For example, processing core 110*a* in FIG. 1 may be configured to initiate a broadcast operation by sending packet 130 to processing core 110*d* using a modified router-bypassing technique that copies the packet to each of the intermediate routers, as described herein, but still allow the packet to skip various pipelines stages at intermediate routers (as indicated by the dashed boxes in processing cores 110*b*-110*d*).

In some embodiments, the copy-at-switch bypassing technique includes core 110*a* determining that each core 110*b*-110*d* includes a respective available input buffer before it sends packet 130 to core 110*d*. Once the packet is received by each core 110*b*-110*d*, each core 110*a*-110*d* may then send their respective copies of the packet along the Y dimension, to the most distant core respectively, using the same copy-at-switch bypassing technique. In embodiments where the mesh interconnect includes additional dimensions (e.g., a z-dimension in a 3D mesh), the sending process may be repeated for each unique dimension. For example, the original core may send the packet using a copy-at-switch bypassing technique to cores in a first dimension (e.g., x-dimension), then all the cores with the packet may send the packet in another dimension (e.g., y-dimension) using the copy-at-switch bypassing technique and finally, every core holding a copy of the packet may send the packet in another dimension (e.g., z-dimension) using the copy-at-switch bypassing technique.

In some embodiments, each core connected by the mesh interconnect may comprise (or be otherwise coupled to) a router unit configured to receive and/or send packets to and from the core.

Figure 2:
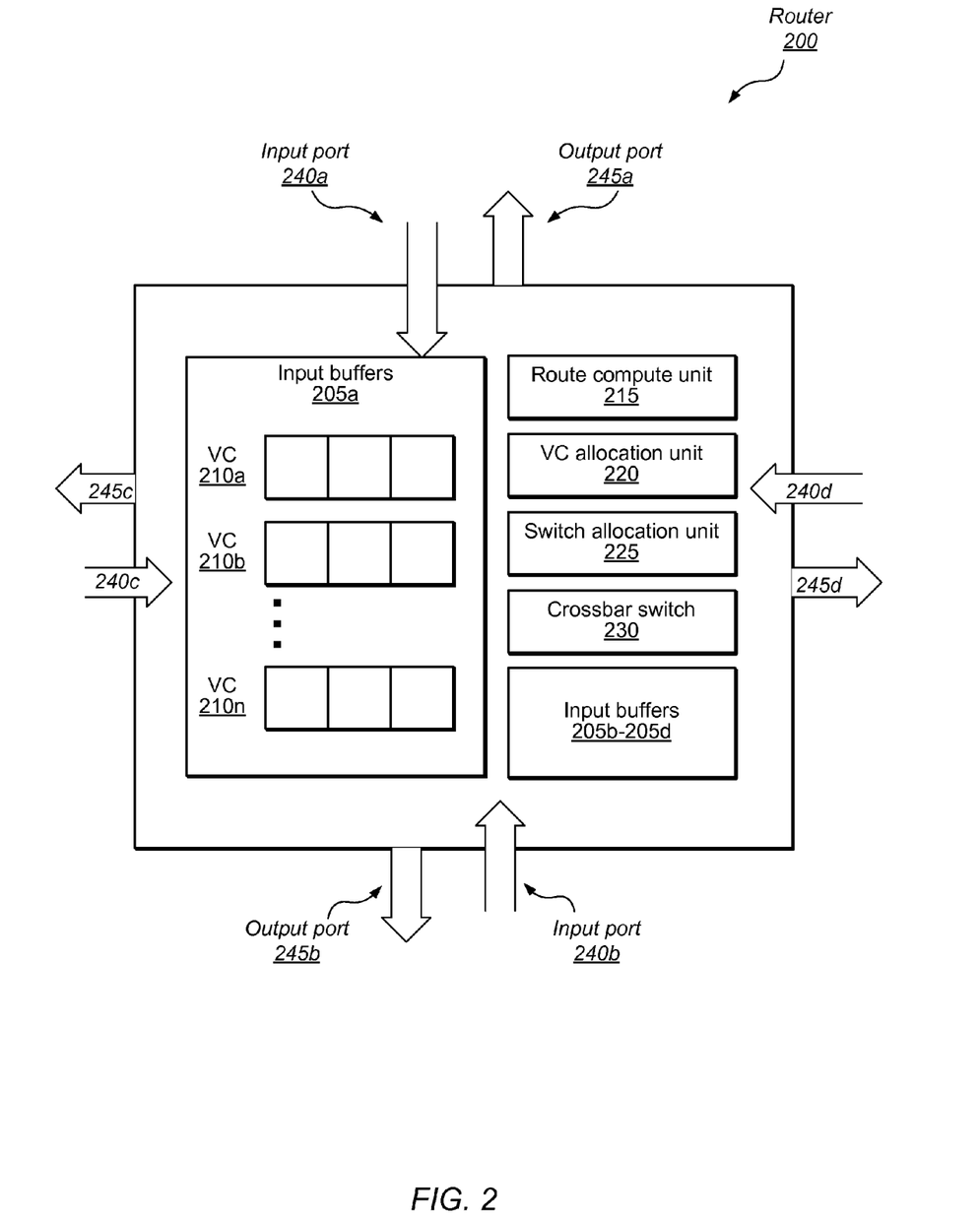
FIG. 2 is a block diagram illustrating components of a router configured to implement copy-at-switch router bypassing techniques as described herein, according to some embodiments.

FIG. 2 is a block diagram illustrating components of a router configured to implement copy-at-switch router bypassing techniques as described herein, according to some embodiments. In the illustrated embodiment, router 200 includes four input ports (240*a*-240*d*) and four output ports (245*a*-245*d*). Each input port may be configured to receive messages from a respective link that connects the node to an adjacent node of the mesh interconnect. Likewise, output ports 245 may be configured to send messages over respective links that connect the node to the adjacent nodes.

In some embodiments, a router may include any number of input and/or output ports to a given adjacent node, including none. In some embodiments, each input and/or output port may be connected to one or more dedicated wires (i.e., links) connecting the port to an adjacent node. In other embodiments, different input and/or output ports may be configured to share physical links.

In some embodiments, the router may include input buffers for storing data received by various ones of input ports 240.

For example, router 200 is configured to store data received via input port 240*a* in input buffers 205*a*. In various embodiments, data received over different input ports may be stored in one or more dedicated input buffers. For example, in FIG. 2, data received over input port 240*a* is stored in dedicated input buffers 205*a*, while data received over other input ports, such as 240*b*-240*d*, may be stored in respective dedicated input buffers 205*b*-205*d*. According to the illustrated embodiment, input buffers 205*a*, are organized into multiple groups called virtual channels 210*a*-210*n*, where each virtual channel comprises some number of input buffers usable to receive and store data from another node. In some embodiments, a node sending data to the router may address the data to particular virtual channels. In some embodiments, before sending data to a virtual channel of router 200, a sending node may ensure that sufficient input buffer space is available in the virtual channel.

In addition to input buffers, router 200 includes other routing components such as route compute unit 215, virtual channel allocation unit 220, switch allocation unit 225, and crossbar switch 230. These components may perform various stages of the router pipeline for sending data to another node on the network. For example, in some embodiments, a full router pipeline may comprise the following stages:

(1) Buffer Write stage—In this stage, the core may write the packet to an input buffer, such as one or more of input buffers 205.

(2) Route Compute stage—In this stage, the route compute unit computes the destination of the packet (3) Virtual Channel Allocation stage—In this stage, the virtual channel allocation unit allocates a virtual channel on the destination node to the packet. In some embodiments, this may comprise determining that a given virtual channel on the destination node is available to receive the packet (e.g., contains enough free space to receive the packet). In various embodiments, the virtual channel may be dedicated to router 200, such that by allocating the channel to a given packet, router 200 guarantees that the virtual channel will include sufficient available space for receiving the packet. That is, router 200 may be configured to prevent an over-allocation of a given virtual channel and/or input buffer on a destination node.

(4) Switch Allocation stage—In this stage, switch allocation unit 225 determines when the packet can use crossbar switch 230. This may be referred to as arbitrating against the other packets for the crossbar switch.

(5) Switch Traversal stage—In this stage, the packet traverses crossbar switch 230, which routes the packet to the appropriate output port 245.

(6) Link Traversal stage—In this stage the packet finally traverses the link connected to the output port and arrives at the destination node. The destination node may store the packet in an input buffer.

In various embodiments, the router pipeline may comprise additional or fewer stages, which may include combinations and/or decompositions of the stages outline above. For example, in some embodiments, the switch allocation and virtual channel allocation stages may proceed in parallel.

As described above, traversing these stages may introduce network latency and therefore, packets that traverse multiple routers to reach their destinations may accumulate significant end-to-end latencies as they traverse the entire pipeline at each router.

According to various embodiments, this overhead may be reduced for broadcast messages by employing copy-at-switch router bypassing techniques, as described herein. In some embodiments, a node broadcasting a packet may determine, in a single virtual channel allocation stage, that each of a plurality of the other nodes has a respective input buffer available for storing the packet. Subsequently the node may send the packet to those other nodes using a copy-at-switch bypassing technique, as described below.

In some embodiments, virtual channel allocation unit 220 may be configured to map a single virtual channel identifier to multiple input buffers distributed across multiple other nodes (e.g., a respective input buffer on each node in a given dimension with the sending node). Thus, during the virtual channel allocation stage, allocating the virtual channel by that identifier to a given packet may ensure that each of the multiple other nodes has an input buffer available to receive the packet. In other embodiments, different techniques may be used to allocate buffers on multiple routers to a packet in a single virtual channel allocation stage. Such techniques may be referred to herein generally as multi-buffer allocation.

Figure 3:
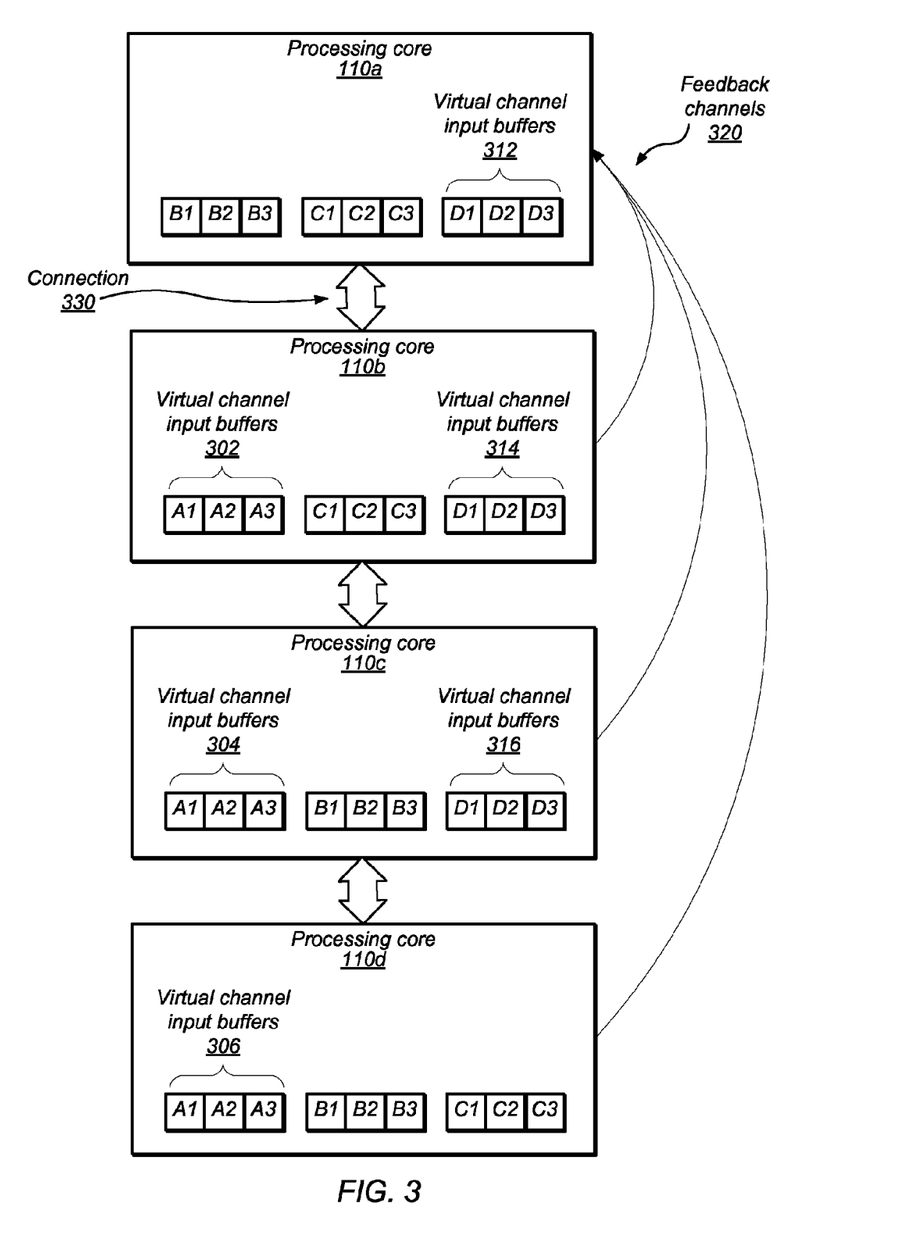
FIG. 3 illustrates a plurality of processing cores in a row of a given dimension in a mesh interconnect configured to implement multi-buffer allocation, according to some embodiments.

FIG. 3 illustrates a plurality of processing cores in a row of a given dimension in a mesh network configured to implement multi-buffer allocation, according to some embodiments. Processing cores 110a-110d in FIG. 3 may correspond to the identically numbered processing cores of FIG. 1. However, in other scenarios, processing cores 110a-110d of FIG. 3 may correspond to the processing cores of a different row, which may be in a different dimension of a mesh interconnect (e.g., cores 110d-110g of FIG. 1).

According to the illustrated embodiment, each processing core 110a-110d is connected to the adjacent core in the row by at least one connection, such as connection 330. Although not illustrated in FIG. 3, each connection comprises one or more input ports, output ports, and physical links as to facilitate bi-directional communication between adjacent cores.

In the illustrated embodiment, each processing core 110a-110d includes various virtual channels (e.g., virtual channels 302-306 and 312-316), each of which comprises a number of input buffers, as indicated by the series of rectangles in each virtual channel.

In various embodiments, buffers of some virtual channels may be dedicated to receiving data only from a particular sender. For example, in the illustrated embodiment, input buffers 302-306 (labeled 'A') may be dedicated to receive messages only from processing core 110a. Likewise, input buffers 312-316 (labeled 'D') may be dedicated to buffering only messages received from processing core 110d.

In some embodiments, each processing core may include at least one separate virtual channel dedicated to each other processing core in each row (i.e., in each dimension of the interconnect). For example, in FIG. 1, processing core 110d may include separate input buffers dedicated to receiving messages from cores 110a, 110b, 110c, 110e, 110f, and 110g respectively. In FIG. 3, each of processing cores 110 includes at least one virtual channel dedicated another of the processing cores 110 in the row.

In some embodiments, a processing core (e.g., 110a) may be configured to determine whether dedicated input buffers are available on multiple target cores (e.g., 110b-110d) by monitoring feedback channels from the other cores (e.g., feedback channels 320). For example, in the illustrated embodiment, processing cores 110b-110d may be configured to detect when a given virtual channel is full or available and in response, to notify core 110a. Likewise, processing core 110a may detect when virtual channel input buffers 312 (dedicated to core 110d) are full or available, and in response, notify core 110d. Thus each processing core in a given row may notify any other core in the row when the corresponding virtual channel is full or available.

Figure 4:
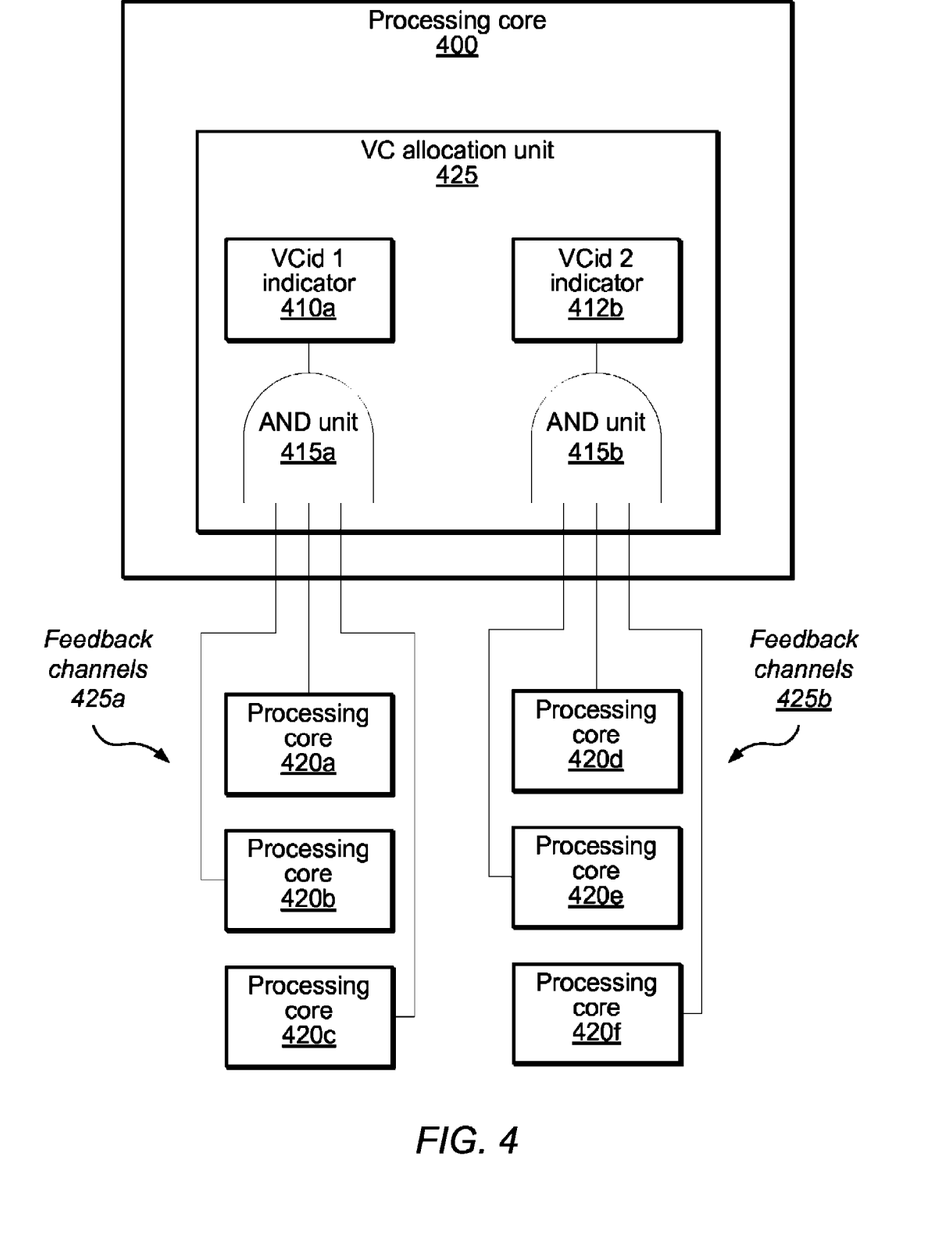
FIG. 4 is a block diagram illustrating a processing core configured to perform multi-buffer allocation, according to some embodiments.

FIG. 4 is a block diagram illustrating a processing core configured to perform multi-buffer allocation, according to some embodiments. In the illustrated embodiment, processing core 400 includes a virtual channel allocation unit 425, which may correspond to virtual channel allocation unit 220 of router 200 and be configured to perform a virtual channel allocation stage of the router pipeline.

According to the illustrated embodiment, VC allocation unit 410 includes indicator 410a, which may store an indication of whether a first virtual channel (Vcid 1) that maps to buffers on multiple target nodes (e.g., cores 420a-420c) is free. For example, each of processing cores 420a-420c may include a dedicated virtual channel for receiving packets from core 400 and be configured to notify core 400 of whether that dedicated virtual channel is full or available, such as via feedback channels 425a.

In some embodiments, the signals from multiple feedback channels (each of which may correspond to different physical links) may be combined to determine whether the virtual channel is free to be allocated to a given packet or other unit of data. For example, the value stored in indicator 410a may be determined by combining the signals from feedback channels 425a according to an AND function provided by 415a. Thus, VC allocation unit 425 may determine that virtual channel 1 is available if and only if buffering is available on each of processing cores 420a-420c. Since the virtual channel allocation unit 425 may only allocate a virtual channel to a packet if the virtual channel is free, allocating the channel to the packet guarantees that each of processing cores 420a-420c is available.

In some embodiments, processing cores 420a-420c may correspond to cores in the same row as processing core 400 in a given dimension (e.g., X-dimension). In some embodiments, VC allocation unit 425 may include additional indicators corresponding to cores in a row along a different given dimension. For example, processing cores 420d-420f may correspond to processing cores in the same row as core 400 in the Y-dimension. Like processing cores 420a-420c, cores 420d-420f each include a respective dedicated virtual channel for receiving data from core 400. Cores 420d-420f may be configured to provide feedback to core 400 regarding the availability of these buffers using feedback channels 425b. VC allocation unit 425 may combine these signals according to a logical AND function provided by AND unit 415b to determine whether a second virtual channel (VCid 2) is available. The result of this determination may be indicated by VCid 2 indicator 412b.

In some embodiments, each processing core (e.g., 420a-420c) may include one or more separate feedback channels to another given processing core (e.g., 400). For example, in some embodiments, a processing core such as 420a may use a dedicated feedback channel to processing core 400 for each virtual channel. In such embodiments, processor 400 may combine the signals from multiple feedback channels (each dedicated to the same virtual channel) using an AND unit, such as AND unit 415a or 415b.

In other embodiments, signals regarding different virtual channels may be sent/received across the same link. For example, processing core 420a may use a single feedback channel to processing core 400 for sending signals regarding different virtual channels. In such embodiments, the signal itself may identify the relevant virtual channel. To process the signal, processing core 400 may include additional components configured to determine which virtual channel a received signal concerns and/or to multiplex the signal to different AND units by virtual channel. In some embodiments, the receiving processing core may record the states of each virtual channel portion on each processing core based on the latest signals received from those cores.

By employing the mechanisms described above, when VC allocation unit 425 allocates a virtual channel to a given packet, it ensures that buffering is available at each of the processing cores mapped to the virtual channel. Once a core allocates a virtual buffer for the broadcast message, the core may send the packet to the cores corresponding to the virtual channel using a router-bypassing technique.

Figure 5:
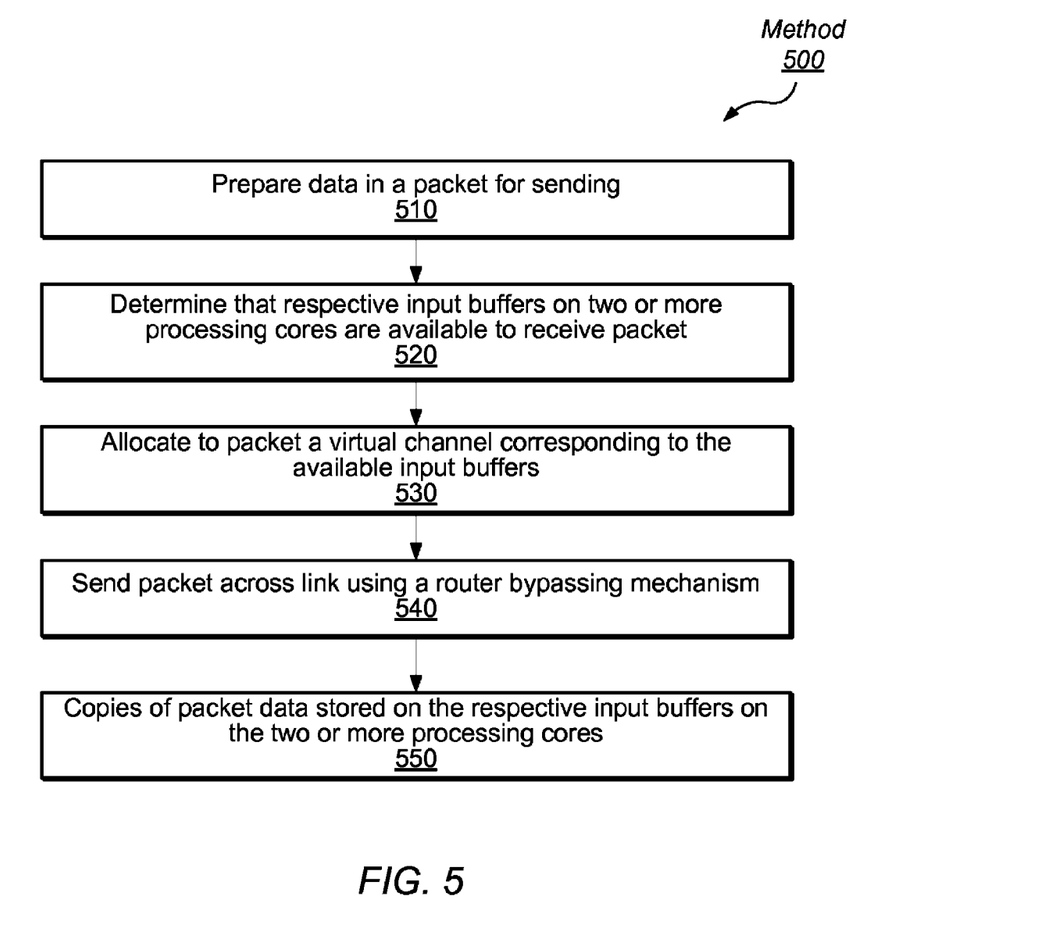
FIG. 5 is a flow diagram illustrating a method for sending a message to a plurality of nodes using a copy-at-switch router bypassing technique, according to some embodiments.

FIG. 5 is a flow diagram illustrating a method for sending a message to a plurality of nodes using a copy-at-switch router bypassing technique, according to some embodiments. In some embodiments, the method of FIG. 5 may be performed by a processing core sending a message to a plurality of other processing cores in its row along a given dimension.

According to the illustrated embodiment, method 500 begins when the sending core prepares a data packet for sending, as in 510. Preparing the data may include constructing the packet (e.g., collecting data, constructing headers, etc.) and/or storing the packet in a local input buffer.

In method 500, the core then determines that respective input buffers on two or more processing cores are available to receive the packet, as in 520. For example, in some embodiments, the core may determine that each core in a given row of the mesh interconnect (e.g., row including the core in a given dimension) includes one or more available buffers. As discussed above, in some embodiments, the core may determine that the buffers on the target cores are available by mapping the buffers to the same virtual channel identifier and then checking an indicator that is informed by feedback channels from the target cores, as shown in FIG. 4.

In some embodiments, the core may perform steps 520 and 530 in a single virtual channel allocation stage. That is, the core need not create multiple copies of the packet for each destination buffer and/or arbitrate separately for each destination buffer.

As in 540, the core may then use a router bypassing mechanism to send the packet to the other cores in the row. In response to receiving the packet, each receiving core may store a respective copy of the packet in one or more of its available input buffers that are dedicated to storing data from the sending core, as in 550.

In various embodiments, the router may use different techniques to send the packet using a router bypassing mechanism in 540. The term router bypassing may refer to the fact that as the packet traverses the routers in the given row, it bypasses one or more stages of the intermediate router pipelines. This bypassing may be done according to different variations in different embodiments (e.g., as discussed below in FIGS. 6 and 7).

Figure 6:
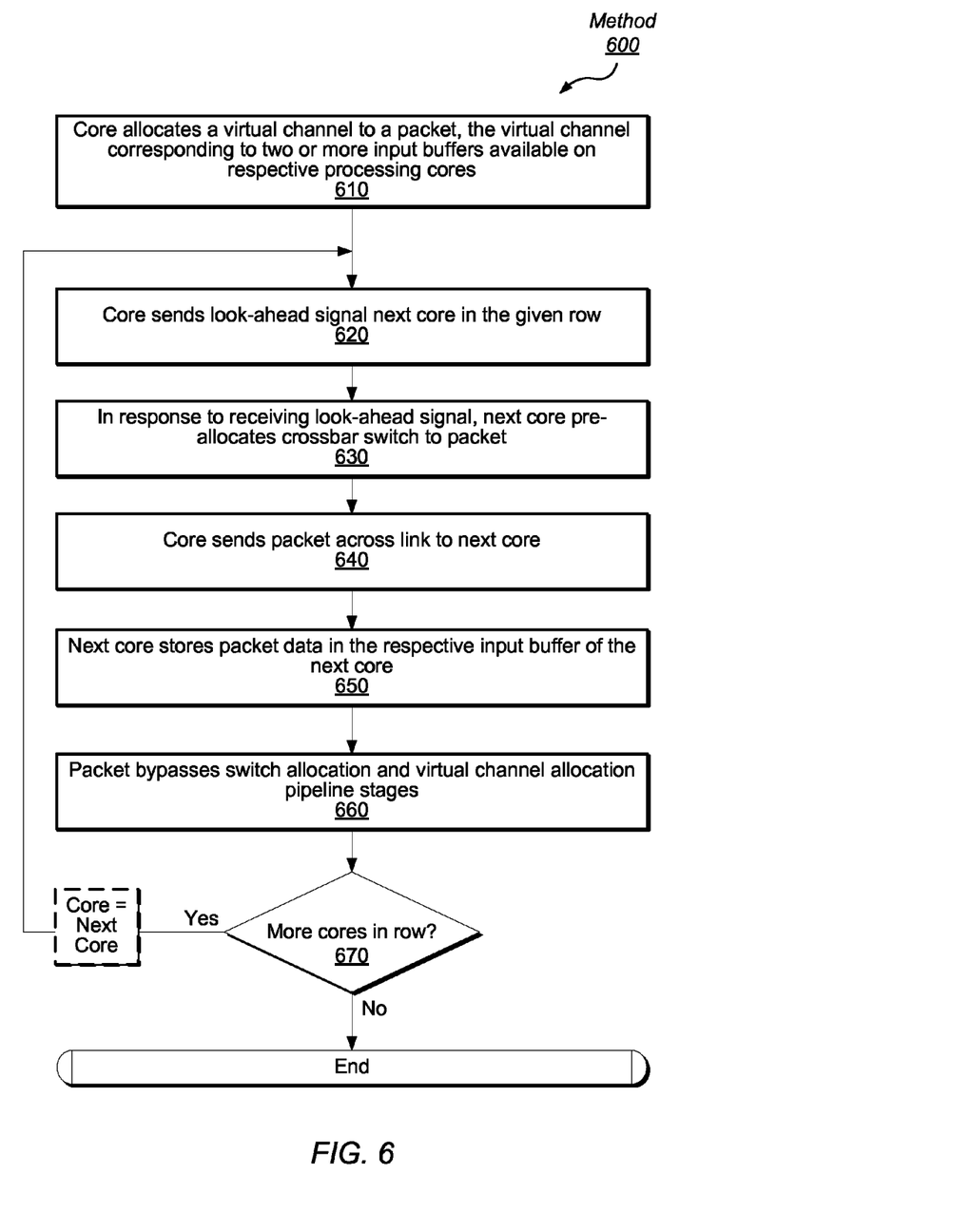
FIG. 6 is a flow diagram illustrating one method for sending data using a router bypassing technique that supports copy-at-switch broadcasting, according to some embodiments.

FIG. 6 is a flow diagram illustrating one method for sending data using a router bypassing technique that supports copy-at-switch broadcasting, according to some embodiments. Method 600 begins when a sending core allocates a virtual channel to a packet, as in 610. As discussed above, the virtual channel may correspond to two or more input buffers available on respective processing cores (e.g., cores in a given row). In some embodiments, the multi-buffer allocation of step 610 may correspond to steps 520-530 of FIG. 5.

After allocating the virtual buffer in 610, the sending core may send a look-ahead signal to the next core of the two or more processors (e.g., the next core in the given row), as in 620. In some embodiments, the look-ahead signal may be communicated using dedicated wires, which may allow it to bypass the switch traversal stage and thus reach the next router ahead of the packet.

According to method 600, in response to receiving the look-ahead signal, the next core pre-allocates the crossbar switch to the packet, as in 630. Thus, when the sending core sends the packet across the link to the next core (as in 640), the receiving core can store the packet data in the respective pre-allocated input buffer (as in 650), and the packet may bypass the switch allocation and/or virtual channel allocation pipeline stages (as in 660).

If there are more cores in the row, as indicated by the affirmative exit from 670, the next core may repeat steps 620-670 with the received packet. This repeating is indicated by the feedback loop from 670 to 620. In this subsequent iteration, the "core" is the "next core" from the previous iteration. When no next core exists in the row, as indicated by the negative exit from 670, then the packet has traversed the entire dimension.

In this embodiment, the router bypassing refers to the packet having bypassed the switch allocation and/or virtual channel allocation stages of the intermediate router pipelines. In this embodiment, the original sending core performed a single virtual channel allocation to allocate respective buffer space on each of the cores in the row before sending the packet to any of the cores. Since the packet bypasses subsequent switch and/or virtual channel arbitration stages at the intermediate nodes, the packet experiences reduced pipeline overheads and therefore, reduced end-to-end latency.

Figure 7:
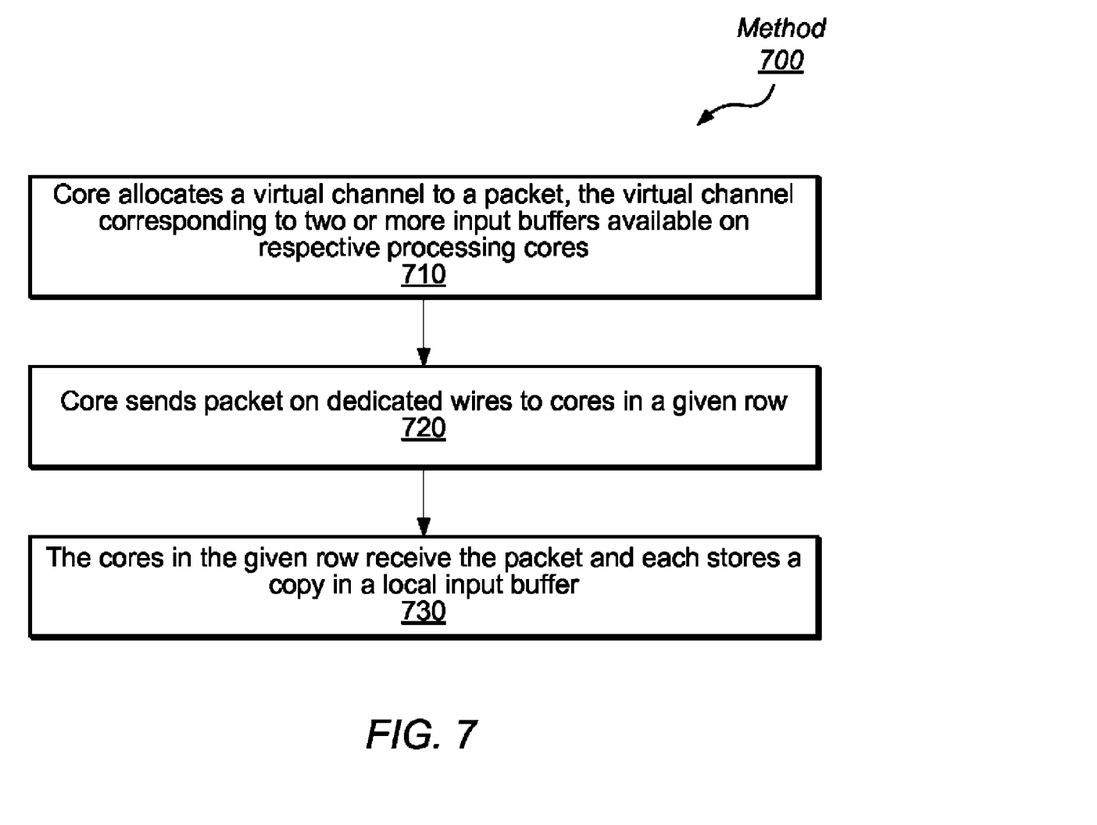
FIG. 7 is a flow diagram illustrating a method for sending data using another router bypassing technique that supports copy-at-switch broadcasting, according to some embodiments.

FIG. 7 is a flow diagram illustrating a method for sending data using another router bypassing technique that supports copy-at-switch broadcasting, according to some embodiments. Method 700 may be executed by a processor that utilizes a topology where each router has separate dedicated links that span the full length of its rows in each dimension. For example, in such embodiments, processing core 110*d* of FIG. 1 may have a first link that traverses the entire length of the X-dimension to core 110*a* and another that traverses the entire length of the Y-dimension to core 110*g*.

In some embodiments, each such dedicated link may include drops (i.e., connections) to each core in the row. For example, a dedicated X-dimension link from 110*d* may include drops to each of processing cores 110*a*-110*c*.

In some such embodiments, an intelligent repeater may connect a dedicated link to each output router in the row and determine whether a packet being sent along the dedicated link should stop at a given router in the row or continue to the next router. In various embodiments, the repeater may quickly decode the packet or use a pre-decoded signal.

According to the illustrated embodiment, method 700 begins when a sending core allocates a virtual channel to a packet, as in 710. As above, the virtual channel may correspond to two or more input buffers available on respective processing cores (e.g., cores in a given row). In some embodiments, the multi-buffer allocation of step 710 may correspond to that of 610 in FIG. 6 and/or to that of steps 520-530 in FIG. 5.

In 720, the core sends the packet on the dedicated link to the cores in the given row. Since the sending core has confirmed that each of the receiving cores has input buffers available for storing the packet, each of the receiving cores may store a copy of the packet in a local buffer, as in 730.

Figure 8:
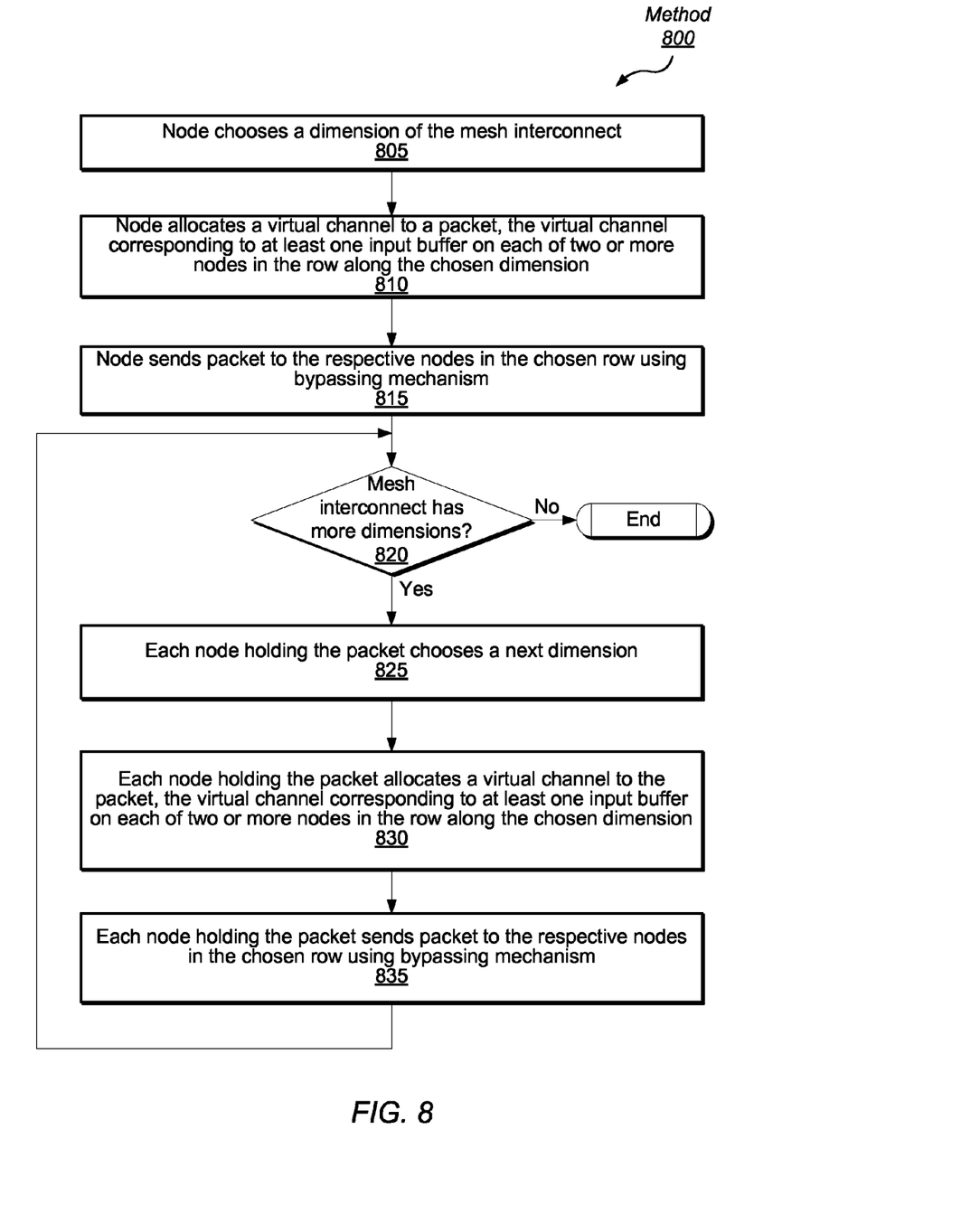
FIG. 8 is a flow diagram illustrating a method for performing a multi-dimensional broadcast using copy-at-switch router bypassing techniques, according to some embodiments.

In some embodiments, broadcasting a message using copy-at-switch router bypassing techniques may comprise various ones of the routers sending the packet along respective rows in various dimensions using the bypassing techniques. FIG. 8 is a flow diagram illustrating a method for performing a multi-dimensional broadcast using copy-at-switch router bypassing techniques, according to some embodiments. In different embodiments, the method of FIG. 8 may be executed by nodes of a mesh interconnect having a 2D or 3D topology.

According to the illustrated embodiment, a node wishing to broadcast a given packet first chooses an initial dimension of the mesh interconnect along which to send the packet, as in 805. For example, the node may choose to first broadcast the packet to other nodes in its X-dimension row. In some embodiments, the node may choose to send the packet along multiple dimensions concurrently.

As in 810, the node may allocate a virtual channel to the packet. The virtual channel corresponds to at least one input buffer on each of the nodes in the row along the chosen dimension. For example, if node 110a of FIG. 1 chooses the x-dimension in 805, it may allocate a virtual channel corresponding to input buffers on cores 110b-110d in 810. In various embodiments, step 810 may correspond to steps 710 of method 700 and/or to step 610 of method 600.

In 815, the node may send the packet to the other nodes in the chosen row using a router bypassing mechanism, such as one of those illustrated in methods 600 and 700. Thus, in response to 815, the nodes in the chosen row may receive and buffer the packet.

If the mesh interconnect has additional dimensions (e.g., Y, Z), as indicated by the affirmative exit from 820, then each node that received the packet in the previous iteration may choose another dimension in which to broadcast the packet, as in 825. In different embodiments, each node may be configured to choose the same or a different dimension than that chosen by others.

In 830, each node holding the packet allocates a virtual channel to the packet, where the virtual channel corresponds to at least one input buffer on each of two or more nodes in a respective row along the chosen dimension. In 835, each of the nodes sends the packet (using the router bypassing technique) to the nodes in its respective chosen row. In essence, in 830-835, each node holding a copy of the packet, repeats the broadcasting method performed by the original node, but to a new set of nodes in a new dimension.

As indicated by the feedback loop from 835 to 820, the process may be repeated for each additional dimension of the mesh interconnect. When the mesh interconnect does not include any more dimensions, as indicated by the negative exit from 820, then the packet is held by every node in the network and the broadcast is complete.

Figure 9:
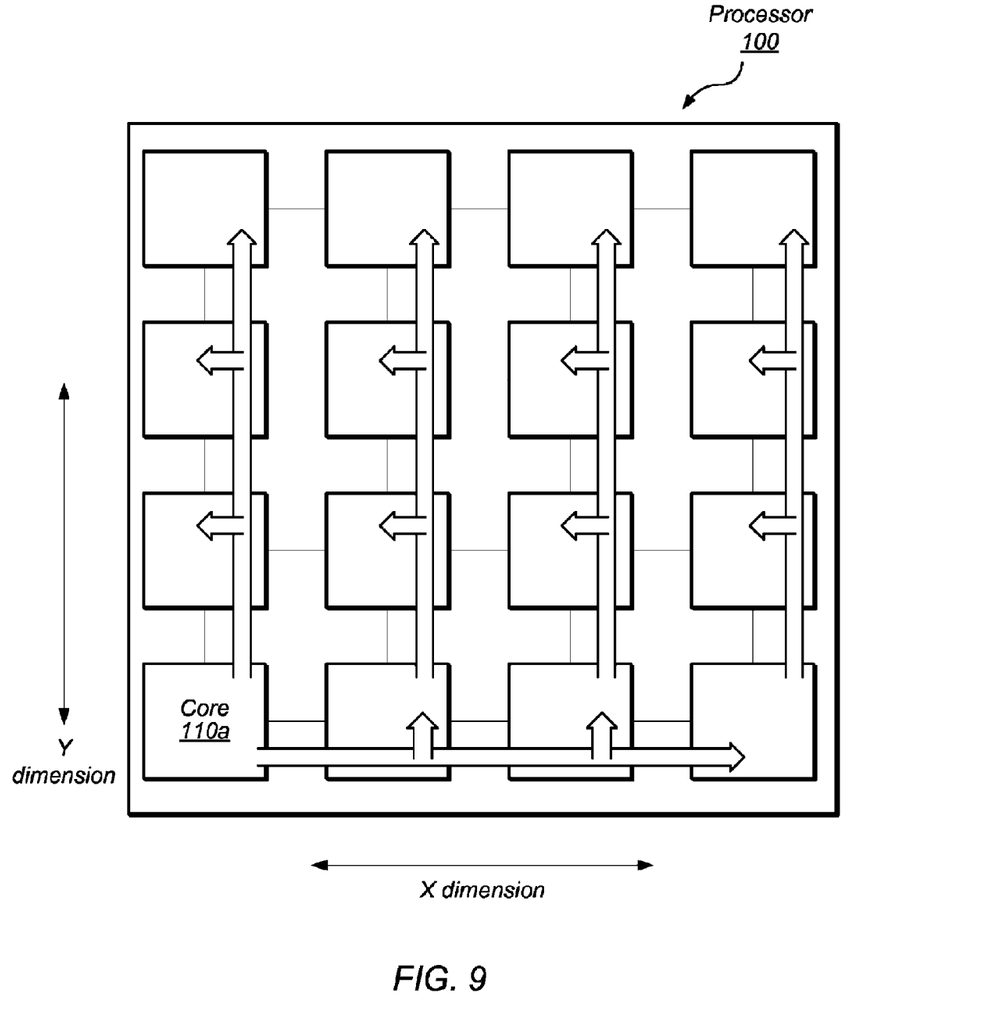
FIG. 9 illustrates information flow of a broadcast operation utilizing copy-at-switch router bypassing mechanisms in a 2D mesh interconnect, according to some embodiments.

FIG. 9 illustrates information flow of a broadcast operation utilizing copy-at-switch router bypassing mechanisms in a mesh interconnect with a 2D topology, according to some embodiments. Processor 100 of FIG. 9 comprises 16 processing cores (e.g., core 110a) arranged in a 2-dimensional, 4×4 grid topology. Processor 100 and core 110a in FIG. 9 may correspond to processor 100 core 110a in FIG. 1.

In the illustrated embodiment, core 110a initiates a broadcast by first preparing a packet and then using a copy-at-switch router bypassing technique to send the packet to the other cores in the row along the X-dimension. The horizontal arrow across the bottom row of processor 100 indicates this broadcast. The auxiliary arrows branching from the horizontal arrow onto each intermediate core indicate that each intermediate core receives and stores the packet in a local buffer.

In various embodiments, core 110a may use method 600 or method 700 to perform the initial broadcast to the cores in the bottom row. This broadcast may include the core pre-allocating buffers on each of the cores in the row (i.e., performing multi-buffer allocation) and then sending the packet using a technique that bypasses at least one router pipeline stage at ones of the intermediate routers. For example, using a method such as 600, core 110a may send a look-ahead message using one or more dedicated wires, thus pre-allocating the crossbar switch for the packet at each router and allowing the packet to bypass a switch allocation and/or virtual buffer allocation stage at the intermediate routers. In another example, core 110a may use a method similar to method 700 in which it pre-allocates the buffers on each target core and then sends collectively to the cores in the row on dedicated wires that drop to each target core. In other embodiments, router 110a may use various other techniques to perform the multi-buffer allocation on the cores in the row and send the packet as to bypass various router stages on intermediate routers.

After core 110a broadcasts the packet to the cores in its row along the X-dimension (as indicated by the horizontal arrow), each core that now holds a copy of the packet may perform an analogous broadcast to the cores in its respective row along the Y-dimension. These broadcasts are illustrated by the vertical arrows emanating from each of the cores in the bottom row of processor 100. As before, each of these broadcasts may include the sending core pre-allocating input buffers on the multiple target cores in its respective row in a single virtual channel allocation stage and then sending the packet to the target cores using a copy-at-switch enabled router bypassing technique.

In response to each broadcast in the Y-dimension, the respective target cores store the packet in their pre-allocated input buffers. Once all the broadcasts in the Y-dimension are complete, every core in the grid holds a copy of the packet and the broadcast operation is therefore complete. In some embodiments, where the topology has additional dimensions (e.g., 3D mesh), the broadcast method may include a further step, where every core holding the packet performs another broadcast in another dimension (e.g., Z-dimension). Again, these broadcasts may be analogous to those performed in the X and Y dimensions, including each core performing a multi-buffer allocation step and a router bypassing sending step, such as in method 600 or 700.

Although the broadcast method is described above as having separate steps for each dimension of the mesh interconnect, those skilled in the art will appreciate that this process need not be performed in lockstep. In some embodiments, each core may send the data set along a given dimension at any time after receiving this data and need not wait or otherwise coordinate its sending activities with those of other cores. In some embodiments, a given core may send the data in multiple dimensions concurrently, such as core 110a sending data along the X and Y dimensions concurrently, using copy-at-switch router bypassing techniques.

Figure 10:
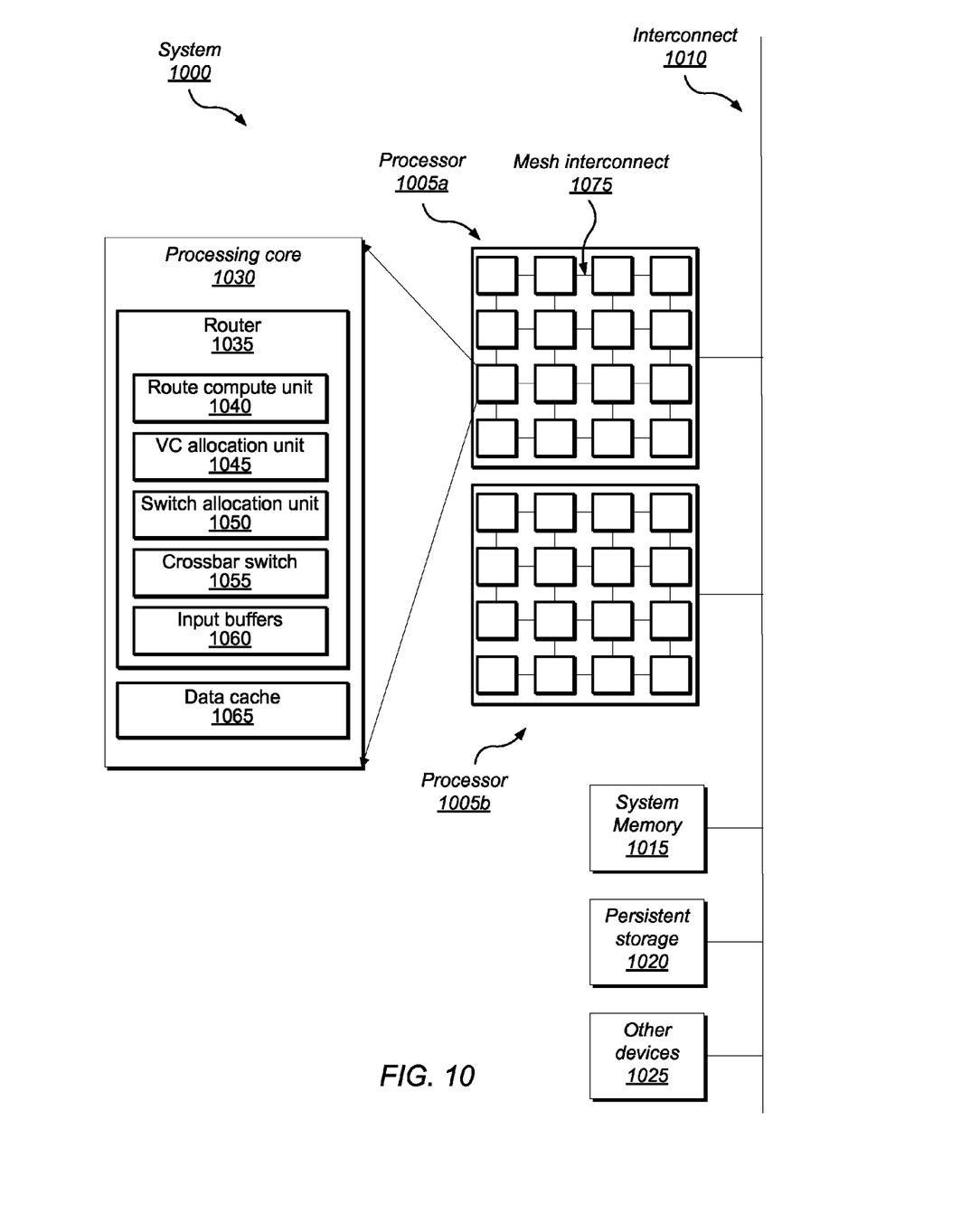
FIG. 10 illustrates a computing system configured to implement copy-at-switch broadcasting with router bypassing as described herein, according to various embodiments.

FIG. 10 illustrates a computing system configured to implement copy-at-switch broadcasting with router bypassing as described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 1000 may include one or more processors (e.g., processors 1005a, 1005b) each of which may include multiple cores (e.g., core 1030) connected by an interconnect (e.g., interconnect 1075). In various embodiments, the interconnect may be arranged according to different topologies (e.g., 2D mesh, 3D mesh, etc.) and any of the cores may be single or multi-threaded.

In some embodiments, each of processors 1005a may be on a separate die, chip, and/or piece of silicon. Processors 1005 may be manufactured by configuring a semiconductor fabrication facility through the use of various mask works. These mask works may be created/generated by the use of netlists, HDL, GDS data, etc.

In some embodiments, each core (e.g., 1030), may include a router, such as router 1035, configured to facilitate communication among the cores using copy-at-switch router bypassing techniques, as described herein. In some embodiments, router 1035 may correspond to router 200 of FIG. 2, and may include one or more route compute units 140, virtual channel allocation units 1045, switch allocation units 1050, crossbar switches 1055, and input buffers 1060. These components may correspond in function to the analogously named units in router 200.

In some embodiments, virtual channel allocation unit 1045 may be configured to perform multi-buffer allocation in support of copy-at-switch, router-bypassing broadcast techniques, as described herein. In different embodiments, router 1035 may include fewer or additional components. In other variations, the functionality of various components of router 1035 may be combined or separated.

The computer system 1000 may also include one or more memories 1015 (e.g., one or more of cache, SRAM, DRAM, RDRAM, EDO RAM, DDR 12 RAM, SDRAM, Rambus RAM, EEPROM, etc.), which may be shared among the processing elements (i.e., processors 1005 and/or processing cores 1030). In some embodiments, different processing elements may include various data caches (e.g., data cache 1065) for locally caching data from shared memory 1015. In some embodiments, the processing elements may be configured to cooperate with others of the processing elements to maintain consistency of data in respective data caches by executing a cache consistency protocol, such as MESI or MOESI. As part of executing such protocols, various ones of the processing elements may broadcast different messages to others of the processing elements, according to one or more of the copy-at-switch router bypassing techniques described herein.

In the illustrated embodiment, system 1000 may also include one or more persistent storage devices 1020 (e.g. optical storage, magnetic storage, hard drive, tape drive, solid state memory, etc) and any number of additional components 1025, such as video cards, audio cards, additional network interfaces, peripheral devices, a network interface such as an ATM interface, an Ethernet interface, a Frame Relay interface, etc. In other embodiments, system 1000 may include additional or fewer components.

The one or more processors 1005, the system memory 1015, persistent storage 1020, and the other devices 1025 may be coupled via a system interconnect 1010. The system interconnect may correspond to a bus network, network (of any topology), and/or to various other types of interconnects enabling communication between the coupled components.

One or more of the system memories 1015 may contain program instructions executable to implement one or more multithreaded programs (e.g., applications, scripts, operating systems, etc.). The program instructions may be encoded in platform native binary, any interpreted language such as Java™ byte-code, or in any other language such as C/C++, Fortran, etc or in any combination thereof.

Any number of the multi-threaded applications may include instructions executable to initiate and/or execute a broadcast operation from at least one of the processing elements (e.g., processors 1005, cores 1030) to one or more others of the processing elements, using copy-at-switch router bypassing techniques as described herein.

In some embodiments, the instructions may be provided on a computer readable storage medium, which may include any tangible (non-transitory) mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above can be used in some embodiments to store instructions read by a program and used, directly or indirectly, to fabricate the hardware comprising system processors 1005a or 1005b. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 1005. The netlist may then be placed and routed to produce a data set describing geometric shapes to be applied to masks. The masks may then be used in various semiconductor fabrication steps to produce a semiconductor circuit or circuits corresponding to processor 1005. Alternatively, the database may be the netlist (with or without the synthesis library) or the data set, as desired.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. An apparatus, comprising:
   a plurality of processing cores connected by a plurality of point-to-point connections within the apparatus, wherein:
   the plurality of processing cores includes at least a first processing core, a second processing core, and a third processing core, wherein the first processing core is configured to send a set of data across one of the plurality of point-to-point connections in response to determining that both the first and the second processing cores comprise respective input buffers available to store the set of data; and
   in response to the first processing core sending the set of data across the one point-to-point connection, the apparatus is configured to deliver the set of data to the second and third processing cores.

2. The apparatus of claim 1, wherein to determine that both the first and the second processing cores comprise respective input buffers available to store the set of data, the first processing core is further configured to receive respective signals from the second and third processing cores, wherein each signal indicates whether the respective sending processing core comprises an input buffer available to store the set of data.

3. The apparatus of claim 2, wherein each of the respective signals is received via a respective dedicated feedback link.

4. The apparatus of claim 1, wherein the respective input buffers of the second and third processing cores are each dedicated to receive data from the first processing core.

5. The apparatus of claim 1, wherein the apparatus is further configured to deliver the set of data to the second and third processing cores by bypassing a router pipeline stage of at least one of the second and third processing cores.

6. The apparatus of claim 5, wherein said bypassing comprises sending a look-ahead message to pre-allocate resources on one or more of the second or third processing cores to the set of data.

7. The apparatus of claim 5, wherein said bypassing comprises broadcasting the set of data across a dedicated wire that includes connections to each of the second and third processing cores.

8. The apparatus of claim 1, wherein the second and third processing cores are configured to receive the set of data, and, in response thereto, to store a respective copy of the set of data in one or more of the respective input buffers.

9. The apparatus of claim 1, wherein the first processing core is further configured to prepare a packet comprising the set of data and one or more headers, wherein sending the set of data comprises sending the packet.

10. The apparatus of claim 1, wherein the point-to-point connections are part of a mesh interconnect arranged according to a mesh topology, the topology having a plurality of dimensions.

11. The apparatus of claim 10, wherein the first, second, and third processing cores are arranged as part of a single row of the mesh interconnect, the row comprising a series of adjacent cores in a given dimension of the plurality of dimensions.

12. The apparatus of claim 11, wherein at least one of the second and third processing cores is configured to: in response to receiving the set of data, send the set of data to two or more other cores of the plurality of processing cores in a column of the mesh interconnect, the column being in a different one of the plurality of dimensions.

13. A method, comprising:
a first processing core broadcasting a set of data to a second processing core and third processing core, wherein the first, second, and third processing cores are connected by a plurality of point-to-point connections within a computing device, and wherein the broadcasting comprises the first processing core sending the set of data across one of the plurality of point-to-point connections in response to determining that both the first and the second processing cores comprise respective input buffers available to store the set of data; and
in response to the first processing core sending the set of data across the one point-to-point connection, delivering the set of data to the second and third processing cores.

14. The method of claim 13, further comprising:
prior to said broadcasting, the first processing core receiving respective signals from the second and third processing cores, wherein each of the received signals indicates whether the respective input buffer on the processing core sending that signal is available to receive the set of data; and
wherein said determining that respective input buffers on the second and third processing cores are available to receive the set of data is based on the first processing core receiving signals.

15. The method of claim 13, wherein the respective input buffers on the second and third processing cores are dedicated to receive data from the first processing core.

16. The method of claim 13, wherein said delivering comprises bypassing a router pipeline stage of at least one of the second and third processing cores.

17. The method of claim 13, wherein the second and third processing cores are each configured to receive the set of data, and, in response thereto, to store a respective copy of the set of data in the respective input buffer for that core.

18. A computer readable storage medium comprising a data structure which is operated upon by a program executable on a computer system, the program operating on the data structure to perform a portion of a process to fabricate an integrated circuit including circuitry described by the data structure, the circuitry described in the data structure including:
a plurality of processing cores connected by a plurality of point-to-point connections within the integrated circuit, wherein:
the plurality of processing cores includes at least a first processing core, a second processing core, and a third processing core, wherein the first processing core is configured to send a set of data across one of the plurality of point-to-point connections in response to determining that both the first and the second processing cores comprise respective input buffers available to store the set of data; and
in response to the first processing core sending the set of data across the one point-to-point connection, the integrated circuit is configured to deliver the set of data to the second and third processing cores.

19. The computer readable storage medium of claim 18, wherein the storage medium stores at least one of HDL, Verilog, or GDSII data.

20. An apparatus, comprising:
a plurality of processors connected by a plurality of point-to-point connections in a multi-dimensional mesh topology, wherein the processors are configured to broadcast a message from a first of the plurality of processors to at least two others of the plurality of processors, and wherein the first of the plurality of processors is configured to perform:
determining that respective input buffers on at least two others of the processors in a given row of the mesh topology are available to receive the message, wherein the row corresponds to a first dimension of the mesh topology; and
in response to the determining, sending the message once across one of the plurality of point-to-point connections; and
wherein, in response to the first processor sending the message across the one point-to-point connection, the apparatus is configured to cause the message to be delivered to the at least two other processors, wherein delivering comprises bypassing at least one stage of a router pipeline of at least one of the at least two other processors.

* * * * *

UNITED STATES PATENT AND TRADEMARK OFFICE
CERTIFICATE OF CORRECTION

| | |
|---|---|
| PATENT NO. | : 9,015,448 B2 |
| APPLICATION NO. | : 12/817945 |
| DATED | : April 21, 2015 |
| INVENTOR(S) | : Krishna et al. |

It is certified that error appears in the above-identified patent and that said Letters Patent is hereby corrected as shown below:

In the Claims

In column 14, line 61 (claim 1), please delete "both the first and the second" and insert --both the second and the third--.

In column 15, line 2 (claim 2), please delete "both the first and the second" and insert --both the second and the third--.

In column 15, lines 57-58 (claim 13), please delete "both the first and the second" and insert --both the second and the third--.

In column 16, line 33 (claim 18), please delete "both the first and the second" and insert --both the second and the third--.

Signed and Sealed this
Eighteenth Day of August, 2015

Michelle K. Lee
*Director of the United States Patent and Trademark Office*